(12) United States Patent
Araki et al.

(10) Patent No.: US 6,221,518 B1
(45) Date of Patent: Apr. 24, 2001

(54) MAGNETORESISTANCE EFFECT FILM AND MAGNETORESISTANCE EFFECT TYPE HEAD

(75) Inventors: Satoru Araki; Haruyuki Morita, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/289,939

(22) Filed: Apr. 13, 1999

(30) Foreign Application Priority Data

May 15, 1998 (JP) .................................................. 10-152069

(51) Int. Cl.[7] ...................................................... G11B 5/66
(52) U.S. Cl. ............. 428/692; 428/694 R; 428/694 TR; 428/394 T; 428/694 TS; 428/694 TM; 428/900; 324/252; 360/113
(58) Field of Search ........................ 428/694 R, 694 TR, 428/694 T, 694 TS, 694 TM, 900, 692; 324/252; 360/113

(56) References Cited

U.S. PATENT DOCUMENTS

| | | | |
|---|---|---|---|
| 5,366,815 | 11/1994 | Araki et al. ........................... | 428/611 |
| 5,510,172 | 4/1996 | Araki et al. ........................... | 428/213 |
| 5,514,452 | 5/1996 | Araki et al. ........................... | 428/213 |
| 5,657,190 | 8/1997 | Araki et al. ........................... | 441/79 |
| 5,661,449 | 8/1997 | Araki et al. ........................ | 338/32 R |
| 5,736,236 | 4/1998 | Araki et al. ........................... | 428/212 |
| 5,783,284 | 7/1998 | Shinjo et al. ......................... | 428/161 |
| 5,789,069 | 8/1998 | Araki et al. ........................... | 428/212 |
| 5,798,896 | 8/1998 | Araki et al. ........................... | 360/324 |
| 5,862,022 | 1/1999 | Noguchi et al. ................... | 360/324.2 |
| 5,874,886 | 2/1999 | Araki et al. ......................... | 338/32 R |
| 5,923,504 | * 7/1999 | Araki ..................................... | 360/113 |
| 5,958,611 | * 9/1999 | Ohta ...................................... | 428/692 |
| 5,968,967 | * 10/1999 | Araki ..................................... | 428/692 |
| 6,004,654 | * 12/1999 | Shinjo .................................. | 428/161 |
| 6,074,743 | * 6/2000 | Aroki ..................................... | 428/332 |
| 6,090,498 | * 7/2000 | Omata .................................. | 428/692 |

* cited by examiner

Primary Examiner—Leszek Kiliman
(74) Attorney, Agent, or Firm—Oblon, Spivak, McClelland, Maier & Neustadt, P.C.

(57) ABSTRACT

In a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, and an antiferromagnetic layer which is formed on a surface of the ferromagnetic layer remote from the other surface thereof abutting the non-magnetic metal layer so as to pin a direction of magnetization of the ferromagnetic layer, the antiferromagnetic layer is made of a compound containing Mn and having a CuAu-I type regular crystal structure and is crystallized by laser irradiation to show antiferromagnetism. Thus, an excellent effect is achieved that mutual diffusion in the laminate film is very small and the MR ratio is very large. Further, when a spin valve head is formed, an excellent effect is achieved that the sensitivity is high and the output is large. Further, the laminate film forming the spin valve film can be reduced in thickness so that a product can be more compact. Moreover, an excellent effect is achieved that the energy loss is small and the productivity is high.

24 Claims, 11 Drawing Sheets

MAGNETORESISTANCE EFFECT FILM AND MAGNETORESISTANCE EFFECT TYPE HEAD

BACKGROUND OF THE INVENTION

1. Field of the Invention

The present invention relates to a magnetoresistance effect film for reading the magnetic field intensity of a magnetic recording medium or the like as a signal and, in particular, to a magnetoresistance effect film which is capable of reading a small magnetic field change as a greater electrical resistance change signal, and further relates to a magnetoresistance effect type head using such a magnetoresistance effect film. They are mainly incorporated in, for example, hard disk drives so as to be used.

2. Description of the Prior Art

Recently, following the high densification of hard disks, highly-sensitive heads with high outputs have been demanded. In response to these demands, spin valve heads have been developed.

The spin valve head has a structure wherein two ferromagnetic layers are formed via a non-magnetic metal layer, and an antiferromagnetic layer is disposed so as to abut one of the ferromagnetic layers. The ferromagnetic layer abutting the antiferromagnetic layer is in exchange coupling to the antiferromagnetic layer so that the magnetization of the ferromagnetic layer is fixed (pinned) in one direction. The magnetization of the other ferromagnetic layer is freely rotated following the change of the external magnetic field. In the spin valve, the MR change is realized by a difference in relative angles of spins between the two ferromagnetic layers. Therefore, the exchange coupling between the antiferromagnetic layer and the ferromagnetic layer abutting thereto can be thought as the substance of the spin valve.

As a material of an antiferromagnetic layer used in the spin valve, FeMn, NiMn, PtMn or the like has been well known.

When FeMn is used as the antiferromagnetic layer, the exchange coupling is generated relative to the ferromagnetic layer immediately after the formation of a film. Thus, a heat treatment for generating the exchange coupling is not required after the film formation. However, there is raised a limitation in order of the film formation that the antiferromagnetic layer should be formed after the formation of the ferromagnetic layer. Further, when FeMn is used, there is a problem that a blocking temperature is low, i.e. about 150 to 170° C. The blocking temperature is a temperature at which the exchange coupling pinning a magnetic layer is lost.

On the other hand, when NiMn or PtMn is used as the antiferromagnetic layer, the blocking temperature is high, i.e. no lower than 300° C., and further, there is no limitation in order of the formation of the antiferromagnetic layer and the ferromagnetic layer. However, for generating the exchange coupling between the antiferromagnetic layer and the ferromagnetic layer, a heat treatment is required in the magnetic field after stacking both layers. This is because, for NiMn or PtMn to exhibit the antiferromagnetism, a CuAu-I type regular crystal structure having a face centered tetragonal (FCT) structure needs to be formed. The heat treatment in the magnetic field is normally carried out under a temperature condition of 250 to 350° C. The degree of exchange coupling tends to be increased as the temperature is raised. However, if the heat treatment at high temperatures is applied to the spin valve film, mutual diffusion at boundary film surfaces of the stacked layers forming the spin valve film is caused so that a magnetoresistance change ratio (MR ratio) being an important film characteristic of the spin valve film is lowered. Therefore, when the spin valve head is formed, the sensitivity becomes poor and the output becomes small. Further, since the mutual diffusion at the boundary film surfaces of the stacked layers is generated, it is necessary to set large the thickness of the laminate film forming the spin valve film for ensuring a desired spin valve film characteristic. Thus, a product can not be more compact. Further, since the heat treatment after the formation of the spin valve film is a process at high temperatures and for a long time, improvement has also been demanded from the viewpoint of energy and productivity.

SUMMARY OF THE INVENTION

The present invention has been made under these circumstances and has objects to provide a magnetoresistance effect film wherein, in a spin valve film having an antiferromagnetic layer made of a compound containing Mn and having a CuAu-I type regular crystal structure which requires a heat treatment for manifesting an antiferromagnetic characteristic, mutual diffusion in the laminate film is very small and the MR ratio is large, and further provide a magnetoresistance effect type head which is excellent in sensitivity and high in output when formed as a spin valve head. It is a further object of the present invention to provide a magnetoresistance effect film wherein a laminate film forming a spin valve film can be reduced in thickness to achieve a more compact product and wherein the energy loss is small and the productivity is high.

For accomplishing the foregoing objects, according to one aspect of the present invention, there is provided a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, and an antiferromagnetic layer which is formed on a surface of the ferromagnetic layer remote from the other surface thereof abutting the non-magnetic metal layer so as to pin a direction of magnetization of the ferromagnetic layer, wherein the antiferromagnetic layer is made of a compound containing Mn and having a CuAu-I type regular crystal structure, and wherein the antiferromagnetic layer is subjected to a crystallization treatment by laser irradiation for showing antiferromagnetism.

According to another aspect of the present invention, there is provided a magnetoresistance effect type head comprising a magnetoresistance effect film, conductive films and electrode portions, wherein the conductive films are conductively connected to the magnetoresistance effect film through the electrode portions, wherein the magnetoresistance effect film is a spin valve type magnetoresistance effect film which comprises a multilayered film including a non-magnetic metal layer, a ferromagnetic layer formed on one surface of the non-magnetic metal layer, a soft magnetic layer formed on the other surface of the non-magnetic metal layer, and an antiferromagnetic layer which is formed on a surface of the ferromagnetic layer remote from the other surface thereof abutting the non-magnetic metal layer so as to pin a direction of magnetization of the ferromagnetic layer, wherein the antiferromagnetic layer is made of a compound containing Mn and having a CuAu-I type regular crystal structure, and wherein the antiferromagnetic layer is subjected to a crystallization treatment by laser irradiation for showing antiferromagnetism.

It is preferable that the crystallization treatment of the antiferromagnetic layer is carried out by applying the laser irradiation to a film surface of the antiferromagnetic layer upon completion of the formation thereof.

It is preferable that the antiferromagnetic layer is formed on a substrate and the laser irradiation is applied to the film surface of the antiferromagnetic layer to crystallize the antiferromagnetic layer so as to manifest an antiferromagnetic characteristic, and that the ferromagnetic layer, the non-magnetic metal layer and the soft magnetic layer are formed in the order named on the antiferromagnetic layer applied with the laser irradiation.

It is preferable that the soft magnetic layer, the non-magnetic metal layer, the ferromagnetic layer and the antiferromagnetic layer are formed on a substrate in the order named, and that the laser irradiation is applied to the film surface of the antiferromagnetic layer to crystallize the antiferromagnetic layer so as to manifest an antiferromagnetic characteristic.

It is preferable that the crystallization treatment of the antiferromagnetic layer is carried out while applying the laser irradiation to a deposit deposited with a lapse of time during the formation of the antiferromagnetic layer.

It is preferable that the laser irradiation is applied to the deposit deposited with a lapse of time while forming the antiferromagnetic layer on a substrate to crystallize the antiferromagnetic layer so as to manifest an antiferromagnetic characteristic, and that the ferromagnetic layer, the non-magnetic metal layer and the soft magnetic layer are formed in the order named on the antiferromagnetic layer applied with the laser irradiation.

It is preferable that after forming the soft magnetic layer, the non-magnetic metal layer and the ferromagnetic layer on a substrate, the laser irradiation is applied to the deposit deposited with a lapse of time while forming the antiferromagnetic layer to crystallize the antiferromagnetic layer so as to manifest an antiferromagnetic characteristic.

It is preferable that the crystallization treatment by the laser irradiation is carried out in a vacuum film forming apparatus.

It is preferable that the antiferromagnetic layer is made of PtMn or an alloy containing PtMn at least no less than 80 at %, or made of NiMn or an alloy containing NiMn at least no less than 80 at %.

It is preferable that an antiferromagnetization promote layer is formed on a substrate directly or via an under layer, and the antiferromagnetic layer, the ferromagnetic layer, the non-magnetic metal layer and the soft magnetic layer are formed on the antiferromagnetization promote layer in the order named, and that the antiferromagnetization promote layer is made of at least one selected from Ir, Pd, Pt, Rh, Ru, Re, Os, Al, Cu, Au and Ag.

It is preferable that the antiferromagnetic layer is made of PtMn or an alloy containing PtMn at least no less than 80 at %, and that the antiferromagnetization promote layer is made of at least one selected from Ir, Pd, Pt, Rh, Ru, Re, Os, Al, Cu, Au and Ag.

It is preferable that the antiferromagnetic layer is made of NiMn or an alloy containing NiMn at least no less than 80 at %, and that the antiferromagnetization promote layer is made of at least one selected from Ir, Pd, Pt, Rh, Ru, Re and Os.

DETAILED DESCRIPTION OF THE INVENTION

Hereinbelow, the concrete carrying-out modes of the present invention will be described in detail.

Figure 1:
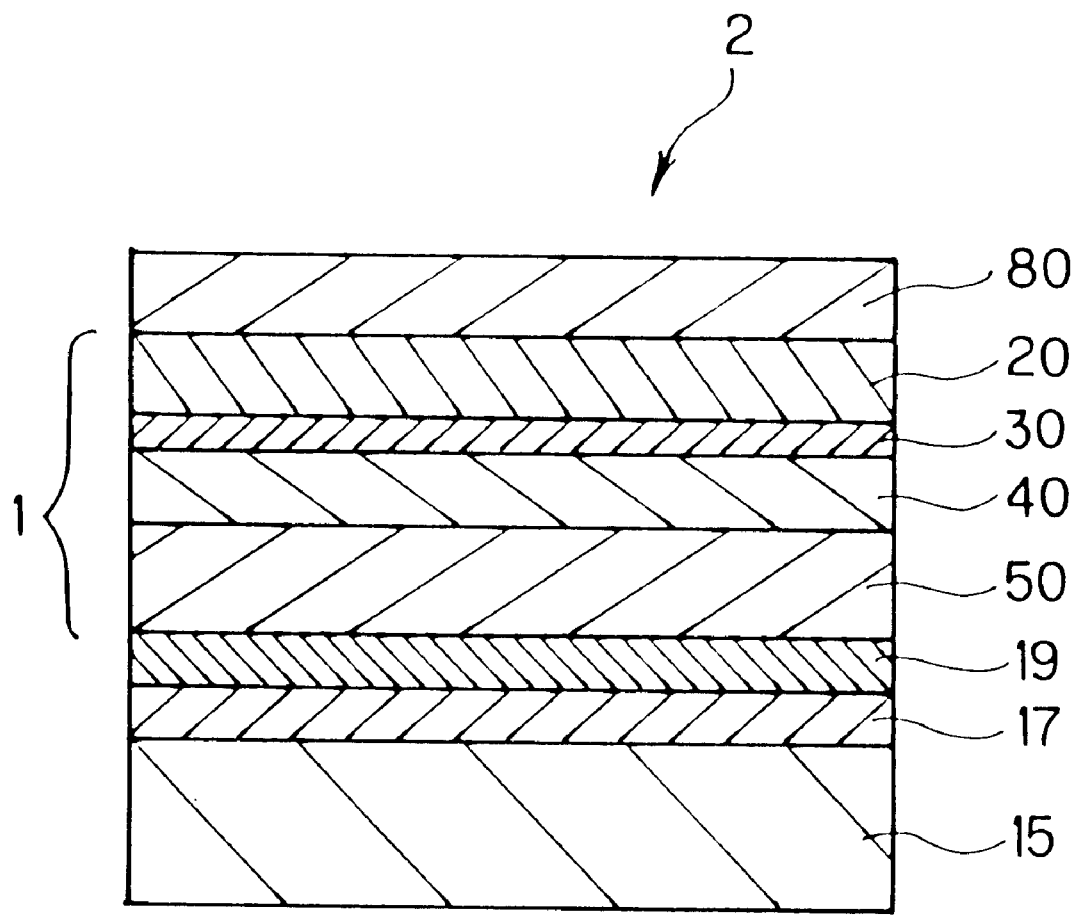
FIG. 1 is a sectional view showing a magnetoresistance effect film according to the present invention.

FIG. 1 is a sectional view showing a preferred example of a magnetoresistance effect film 2. In this carrying-out mode, the magnetoresistance effect film 2 has a magnetic multilayered film 1 as a spin valve film showing a giant magnetoresistance effect.

As shown in FIG. 1, the magnetic multilayered film 1 has a laminate body structure which comprises a non-magnetic metal layer 30, a ferromagnetic layer 40 formed on one surface of the non-magnetic metal layer 30, a soft magnetic layer 20 formed on the other surface of the non-magnetic metal layer 30, and an antiferromagnetic layer 50 which is formed on a surface of the ferromagnetic layer 40 remote from the other surface thereof abutting the non-magnetic metal layer 30 so as to pin the direction of magnetization of the ferromagnetic layer 40. Further, in the carrying-out mode shown in FIG. 1, as a more preferable structure, an antiferromagnetization promote layer 19 is formed on a surface of the antiferromagnetic layer 50 remote from the other surface thereof abutting the ferromagnetic layer 40.

In the preferred carrying-out mode shown in FIG. 1, the laminate body is formed on a substrate 15, and they are laminated from the side of the substrate 15 via an under layer 17 in the order of the antiferromagnetization promote layer 19, the antiferromagnetic layer 50, the ferromagnetic layer 40, the non-magnetic metal layer 30 and the soft magnetic layer 20. As shown in FIG. 1, a protective layer 80 is further formed on the soft magnetic layer 20.

In the magnetic multilayered film 1 (spin valve film) according to this carrying-out mode, it is required that the soft magnetic layer 20 and the ferromagnetic layer 40 which are adjacently formed at both sides of the non-magnetic metal layer 30 have substantially different magnetization directions from each other in accordance with a signal magnetic field applied from the external. The reason is as follows: In the principle of the present invention, when the magnetization directions of the soft magnetic layer 20 and the ferromagnetic layer 40 which are formed via the non-magnetic metal layer 30 interposed therebetween are deviated from each other, conduction electrons have a behavior of scattering due to spins to increase its resistance. In this case, when the magnetization directions are opposite to each other, the maximum resistance is obtained. That is, in this invention, when a signal magnetic field from the external is positive (in an upward direction with respect to a recording surface 93 of a recording medium 90 (represented by reference numeral 92)) as shown in FIG. 2, there occur mutually opposite components in the magnetization directions of the neighboring magnetic layers so that the resistance is increased.

Here, the relationship among the external signal magnetic field from the magnetic recording medium, the magnetization directions of the soft magnetic layer 20 and the ferromagnetic layer 40 and the variation of electrical resistance in the (spin valve) magnetic multilayered film used in the magnetoresistance effect film of the present invention will be described.

Now, in order to facilitate the understanding of the present invention, the simplest magnetic multilayered film in which the pair of soft magnetic layer 20 and ferromagnetic layer 40 exist via the non-magnetic metal layer 30 as shown in FIG. 1 will be described with reference to FIG. 2.

Figure 2:
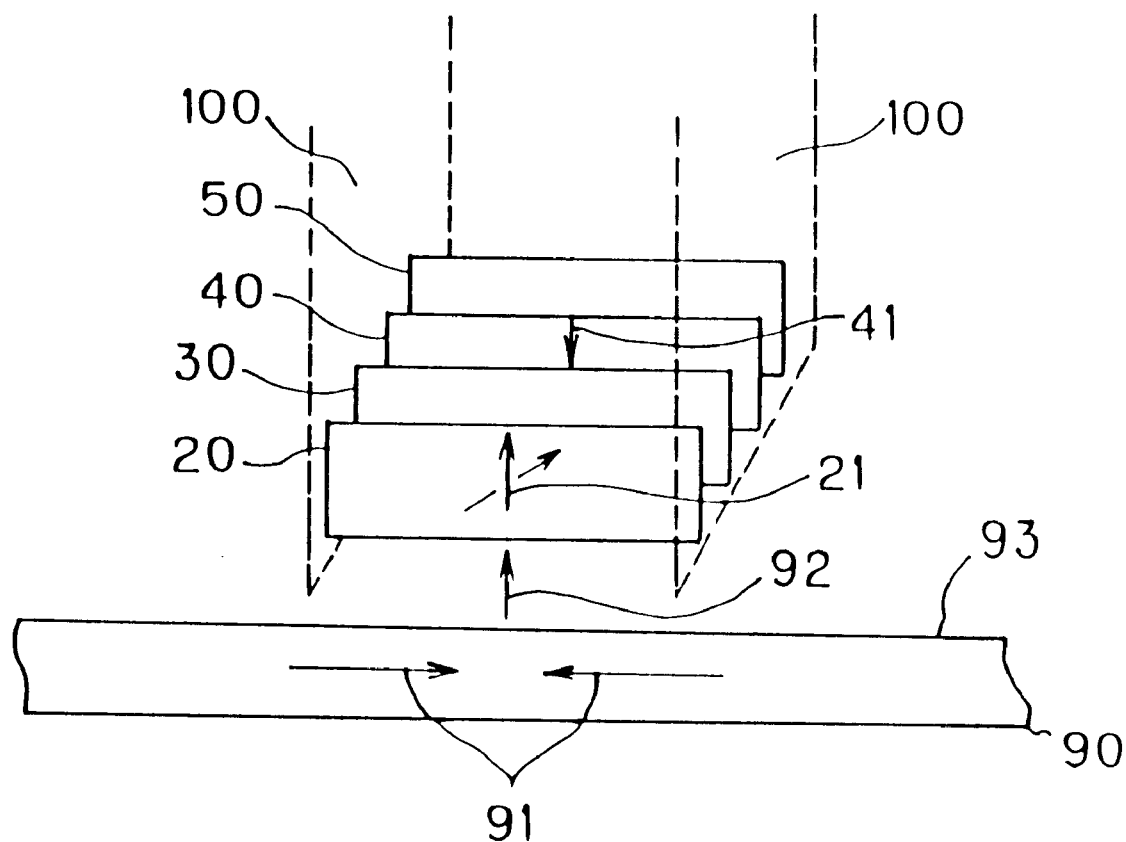
FIG. 2 is a schematic diagram showing a magnetoresistance effect film, particularly, a structure of a magnetic multilayered film, for explaining an operation of the present invention.

As shown in FIG. 2, the magnetization of the ferromagnetic layer 40 is pinned in a downward direction to the surface of the recording medium by a method as described later (see reference numeral 41). The soft magnetic layer 20 is formed via the non-magnetic metal layer 30 so that the magnetization direction thereof is varied in accordance with the signal magnetic field from the external (see reference numeral 21). At this time, the relative angle between the magnetization directions of the soft magnetic layer 20 and the ferromagnetic layer 40 is greatly varied in accordance with the direction of the signal magnetic field from the magnetic recording medium 90. As a result, the scattering degree of the conduction electrons flowing in the magnetic layers is varied, and thus the electrical resistance is greatly varied.

Accordingly, a large MR (Magneto-Resistance) effect, which essentially differs in mechanism from the anisotropic magnetoresistance effect of Permalloy, can be obtained. This is particularly called a GMR (Giant-Magneto-Resistance) effect.

Figure 3:
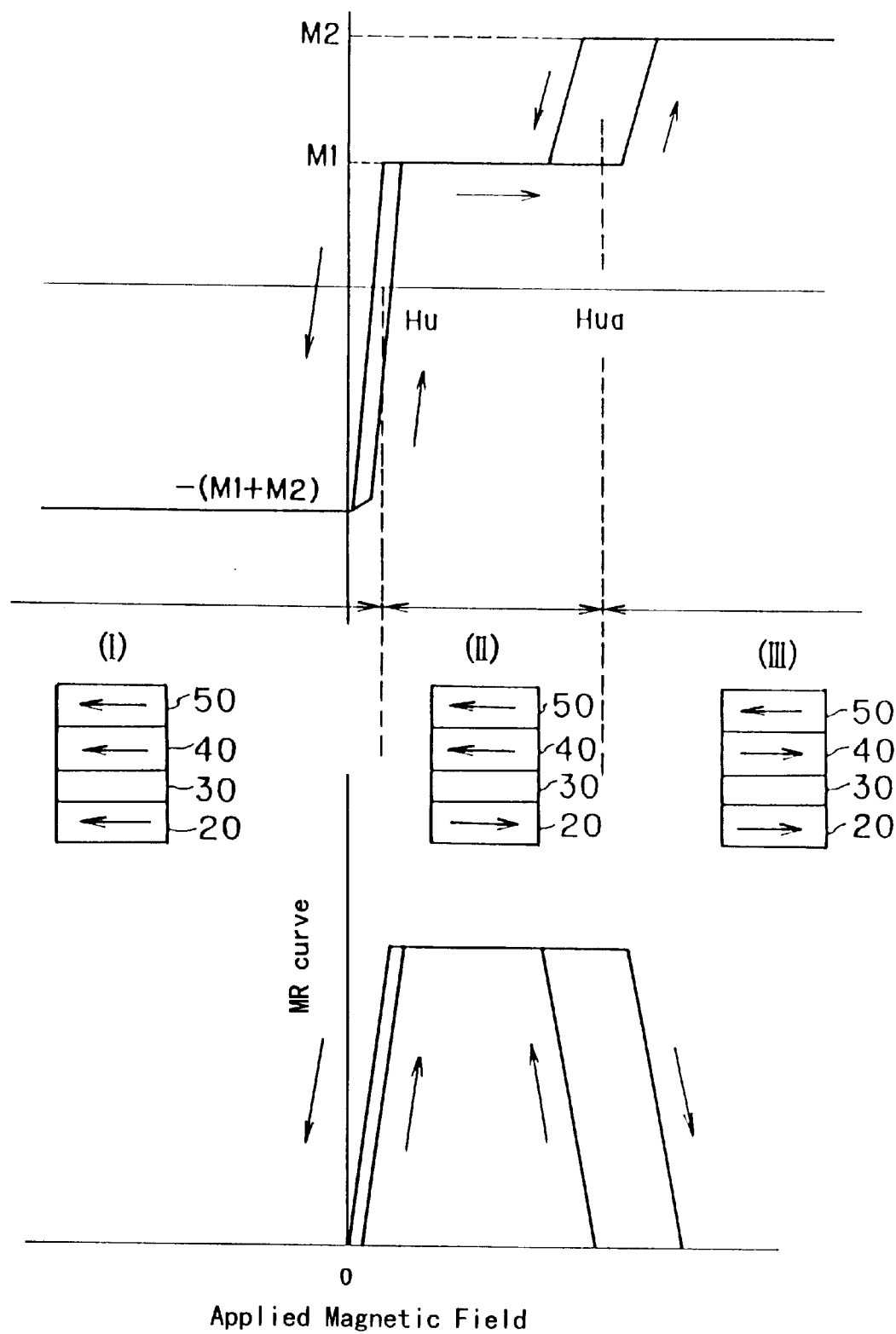
FIG. 3 is a schematic diagram showing a magnetization curve and an MR curve for explaining an operation of the present invention.

The magnetization directions of the soft magnetic layer 20, the ferromagnetic layer 40 and the antiferromagnetic layer 50 exhibiting a pinning effect are varied relative to the external magnetic field. The variation of the magnetization directions thereof is shown in FIG. 3 in correspondence with the magnetization curve and the MR curve. In this case, all the magnetization of the ferromagnetic layer 40 is fixed in a minus direction (in a downward direction with respect to the recording surface of the recording medium 90) by the antiferromagnetic layer 50. When the external signal magnetic field is minus, the magnetization of the soft magnetic layer 20 is also in the minus direction. Now, it is assumed that the coercive force of each of the soft magnetic layer 20 and the ferromagnetic layer 40 is approximate to zero in order to simplify the description. In an area (I) where the signal magnetic field H<0, the magnetization of both the soft magnetic layer 20 and the ferromagnetic layer 40 is oriented in one direction.

When the external magnetic field is intensified and H exceeds the coercive force of the soft magnetic layer 20, the magnetization direction of the soft magnetic layer is rotated in the direction of the signal magnetic field, so that the magnetization and the electrical resistance are increased as the magnetization directions of the soft magnetic layer 20 and the ferromagnetic layer 40 become antiparallel to each other. Finally, these values are fixed (state of an area (II)). At this time, a pinning magnetic field Hua is applied by the antiferromagnetic layer 50. If the signal magnetic field exceeds Hua, the magnetization of the ferromagnetic layer 40 is also rotated in the direction of the signal magnetic field, so that the magnetization of each of the soft magnetic layer 20 and the ferromagnetic layer 40 is oriented in the same direction in an area (III). At this time, the magnetization is set to a constant value, and the MR curve is equal to zero.

Conversely, when the signal magnetic field H is reduced, the magnetization is changed from the area (III) through the area (II) to the area (I) by inversion of the magnetization of the soft magnetic layer 20 and the ferromagnetic layer 40 in the same manner as described above. At an initial portion of the area (II), conduction electrons have a behavior of scattering dependent on spins, and the resistance is increased. In the area (II), the ferromagnetic layer 40 has little magnetization inversion because it is pinned, while the magnetization of the soft magnetic layer 20 increases linearly, so that the rate of spin-dependent scattered conduction electrons is gradually increased in accordance with the magnetization change of the soft magnetic layer 20. That is, if $Ni_{0.8}Fe_{0.2}$ whose Hc is low is selected for the soft magnetic layer 20 and a suitable unidirectional anisotropic magnetic field Hk is applied, a formed magnetic multilayered film has a linearly-varying resistance and a large magnetoresistance ratio in a small external magnetic field of several Oe to several tens Oe below Hk.

Hereinbelow, each constitution of the foregoing magnetoresistance effect film 2 will be described in detail. The first feature of this magnetoresistance effect film resides in that the antiferromagnetic layer 50 is made of a compound containing Mn and having a CuAu-I type regular crystal structure and that the antiferromagnetic layer 50 is heated by laser irradiation so as to be subjected to a crystallization treatment. Due to the crystallization treatment, the antiferromagnetic layer 50 exhibits antiferromagnetism.

The CuAu-I type regular crystal structure is described in "Magnetic Body Handbook (Asakura Bookstore), pp. 401 to 403" and defined as, for example, a crystal structure of PtMn, NiMn or PdMn.

The antiferromagnetic layer 50 may be made of PtMn, NiMn or PdMn, preferably PtMn or NiMn, more preferably PtMn because the greater exchange coupling energy Jk can be obtained. Further, the antiferromagnetic layer 50 may have a composition of three or more elements, such as an alloy containing PtMn no less than at least 80 at % or an alloy containing NiMn no less than at least 80 at %. Preferred three-element composition examples are as follows:

| PtMn | NiMn |
|---|---|
| (I-1) PtMnRh | (II-1) NiMnRh |
| (I-2) PtMnCr | (II-2) NiMnCr |
| (I-3) PtMnPd | (II-3) NiMnPd |
| (I-4) PtMnIr | (II-4) NiMnIr |
| (I-5) PtMnNi | (II-5) NiMnFe |
| (I-6) PtMnAu | (II-6) NiMnAu |
| (I-7) PtMnAg | (II-7) NiMnAg |
| (I-8) PtMnFe | (II-8) NiMnCu |
| (I-9) PtMnCu | (II-9) NiMnRu |
| (I-10) PtMnRu | (II-10) NiMnCo |

Laser irradiation methods for accomplishing the crystallization treatment to manifest the antiferromagnetism are roughly divided into the following two methods:

(1) Laser Irradiation Method I

This is a method wherein upon completion of the formation of an antiferromagnetic layer, laser irradiation is applied to the film surface thereof so as to carry out a crystallization treatment.

Figure 4:
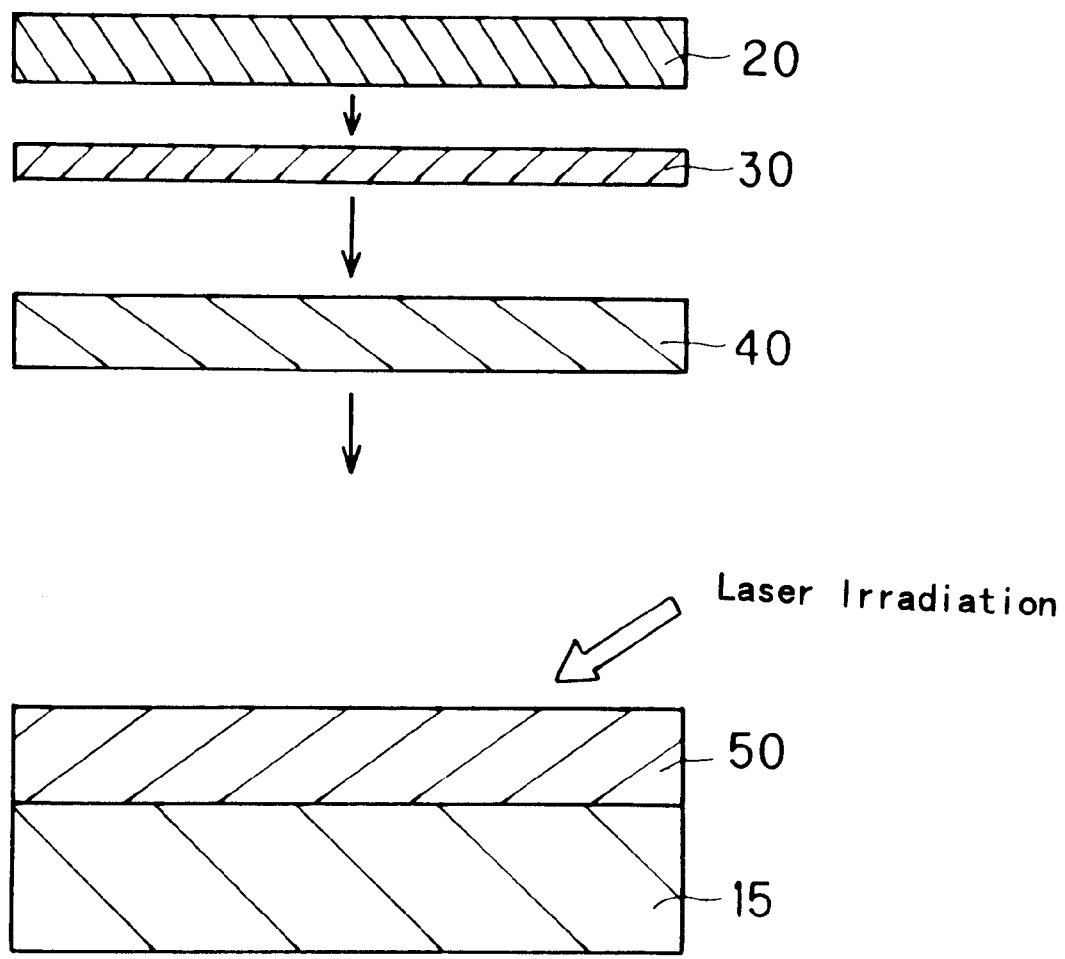
FIG. 4 is a schematic sectional view showing the state wherein an antiferromagnetic layer is formed on a substrate, and laser irradiation is applied to the film surface of the antiferromagnetic layer so as to crystallize it.

Specifically, as shown in FIG. 4, an antiferromagnetic layer 50 is formed on a substrate 15, and then laser irradiation is applied to the film surface of the antiferromagnetic layer 50 to crystallize the antiferromagnetic layer 50 for manifesting the antiferromagnetic characteristic. The laser irradiation is preferably implemented in a vacuum film forming apparatus for preventing oxidation of the film surface of the antiferromagnetic layer 50 and preventing adsorption of impurity gas particles and stains onto the film surface thereof. Subsequently to the laser irradiation treatment, a ferromagnetic layer 40, a non-magnetic metal layer 30 and a soft magnetic layer 20 are formed in the order named on the treated antiferromagnetic layer 50 so that a so-called spin valve film is formed (hereinafter, this layer stacking order will be referred to as "antiferromagnetic layer 50 bottom type")

Figure 5:
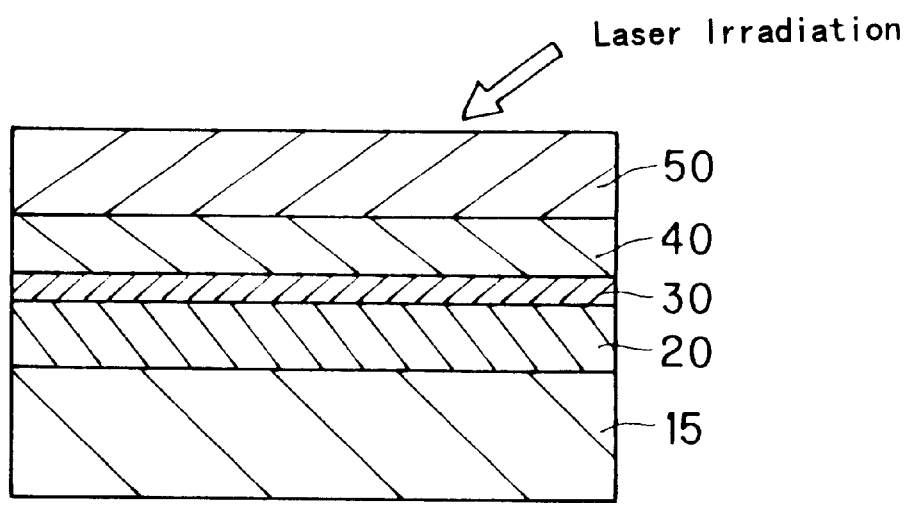
FIG. 5 is a schematic sectional view showing the state wherein a soft magnetic layer, a non-magnetic metal layer, a ferromagnetic layer and an antiferromagnetic layer are formed on a substrate in the order named, and laser irradiation is applied to the film surface of the antiferromagnetic layer so as to crystallize it.

On the other hand, as shown in FIG. 5, the layer stacking order may be changed so that a soft magnetic layer 20, a non-magnetic metal layer 30, a ferromagnetic layer 40 and an antiferromagnetic layer 50 are formed in the order named on a substrate 15 (hereinafter, this layer stacking order will be referred to as "antiferromagnetic layer 50 top type"), and laser irradiation is applied onto the film surface of the antiferromagnetic layer 50 to crystallize the antiferromagnetic layer 50 for revealing the antiferromagnetic characteristic. Like the case in FIG. 4, the laser irradiation is preferably implemented in a vacuum film forming apparatus.

As described above, by using the laser irradiation to heat only such a portion (antiferromagnetic layer 50 in this carrying-out mode) where the temperature needs to be increased, mutual heat diffusion at boundary film surfaces of the stacked layers forming the spin valve film can be prevented. Conventionally, after the film layers are stacked to form the spin valve film, annealing is carried out to heat the whole spin valve film over a long time so as to crystallize the antiferromagnetic layer. Therefore, the mutual heat diffusion occurs at boundary film surfaces of the layers forming the spin valve film so that deterioration of a characteristic as the spin valve film (e.g. lowering of a magnetoresistance change ratio (MR ratio)) is caused.

(2) Laser Irradiation Method II

Figure 6:
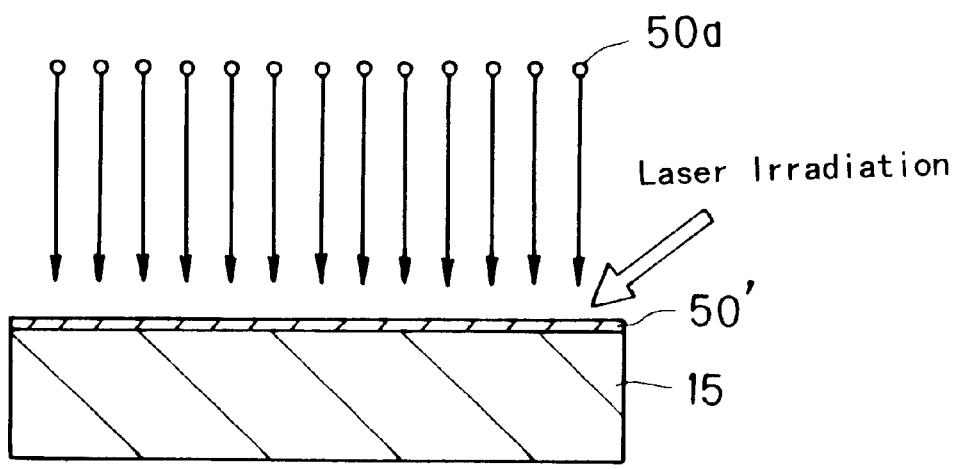
FIG. 6 is a schematic sectional view showing the state 20 wherein laser irradiation is continuously applied to a deposit deposited with a lapse of time during formation of an antiferromagnetic layer.

This is a method wherein laser irradiation is continuously applied to a deposit deposited with a lapse of time during the formation of an antiferromagnetic layer. With this arrangement, crystallization is advanced simultaneously with deposition of a deposit forming the antiferromagnetic layer. FIG. 6 is a schematic conceptual diagram showing such a state. In FIG. 6, reference sign 50' denotes a deposit forming an antiferromagnetic layer during the film formation and being subjected to a crystallization treatment by laser irradiation. On the other hand, reference sign 50a denotes dispersed particles during the film formation. This method II is also applicable to either of the antiferromagnetic layer 50 bottom type and the antiferromagnetic layer 50 top type.

As described above, by using the laser irradiation to heat only such a portion where the temperature needs to be increased, the mutual heat diffusion at boundary film surfaces of the stacked layers forming the spin valve film can be prevented.

There is no particular limitation to the irradiation condition of a laser to be used as long as crystallization of the antiferromagnetic layer 50 can be manifested. It is preferable that the laser energy is set to about 1 mJ to 10 J. Upon laser irradiation onto the film surface, a raster scan method of scanning a laser beam at high speed, a method of applying one-shot irradiation of a collimator beam via a lens system, or the like may be used. In case of the raster scan method, it is preferable that the cycle (frequency) of scan is set to about 1 to 100 cycle/sec. There is no particular limitation to the kind of a laser to be used, so that one which can obtain a desired output may be adequately selected.

Through the laser irradiation, the antiferromagnetic layer 50 is crystallized and exhibits the antiferromagnetism. Accordingly, the ferromagnetic layer 40 which is formed abutting the antiferromagnetic layer 50 can be pinned.

In the antiferromagnetic layer 50 bottom type wherein the antiferromagnetic layer 50 is located at a side of the substrate, it is preferable to form the antiferromagnetization promote layer 19 on a surface (near the substrate) of the antiferromagnetic layer 50 remote from the other surface thereof abutting the ferromagnetic layer 40 as shown in FIG. 1. By providing the antiferromagnetization promote layer 19, crystallization by laser irradiation can be achieved with lower energy so that a further excellent film can be obtained without lowering of the film quality. Further, the thickness of the antiferromagnetic layer 50 can be made smaller so that the high-density recording can be realized.

As the antiferromagnetization promote layer 19, Ir, Pd, Pt, Rh, Ru, Re, Os, Al, Cu, Au or Ag, for example, can be used. However, upon selection of the antiferromagnetization promote layer 19, it is preferable to perform selection so as to realize the optimum effect in relation to a material of the antiferromagnetic layer 50 to be used.

Hereinbelow, how to select a concrete material of the antiferromagnetization promote layer 19 will be described in detail in each of cases where PtMn (including a three-element composition) is used as a preferred material of the antiferromagnetic layer 50 and NiMn (including a three-element composition) is used as a preferred material of the antiferromagnetic layer 50.

(1) In Case of Using PtMn as Antiferromagnetic Layer 50

The composition ratio (atomic %) of PtMn used as the antiferromagnetic layer 50 is normally such that Mn is set to 40 to 60 at %. If the Mn content deviates from this range, the regular crystal structure can not be formed in general so as not to reveal the antiferromagnetism.

When PtMn is used as the antiferromagnetic layer 50, it is preferable that the antiferromagnetization promote layer 19 is made of at least one selected from Ir, Pd, Pt, Rh, Ru, Re, Os, Al, Cu, Au and Ag.

Among the foregoing elements, Pt, Pd, Rh and Re are preferable, and Pt and Pd are the most preferable.

The antiferromagnetization promote layer 19 may be made of an alloy containing at least one of the foregoing elements, preferably PtRh or NiRh, particularly PtRh, for example.

The thickness of the antiferromagnetization promote layer 19 is set to 0.1 to 10 nm, preferably 1 to 10 nm, more preferably 2 to 5 nm. If the thickness becomes less than 0.1 nm, the effect of the antiferromagnetization promote layer 19 itself is not revealed. On the other hand, if the thickness exceeds 10nm so as to be too thick, there is raised a disadvantage that the electrical resistance of the antiferromagnetization promote layer 19 is reduced to allow an unwanted sense current to flow in this portion so that the output is lowered.

(2) In Case of Using NiMn as Antiferromagnetic Layer 50

The composition ratio (atomic %) of NiMn used as the antiferromagnetic layer 50 is normally such that Mn is set to 40 to 60 at %. If the Mn content deviates from this range, the regular crystal structure can not be formed in general so as not to reveal the antiferromagnetism.

When NiMn is used as the antiferromagnetic layer 50, it is preferable that the antiferromagnetization promote layer 19 is made of at least one selected from Ir, Pd, Pt, Rh, Ru, Re and Os.

Among the foregoing elements, Pd, Ir and Rh are preferable materials, and Rh and Pd are the most preferable materials. The antiferromagnetization promote layer 19 may be made of an alloy containing at least one of the foregoing elements, preferably PtRh or NiRh, particularly PtRh, for example.

Like the foregoing case (1), the thickness of the antiferromagnetization promote layer 19 is set to 0.1 to 10 nm, preferably 1 to 10 nm, more preferably 2 to 5 nm. If the thickness becomes less than 0.1 nm, the effect of the antiferromagnetization promote layer 19 itself is not revealed. On the other hand, if the thickness exceeds 10nm so as to be too thick, there is raised a disadvantage that the electrical resistance of the antiferromagnetization promote layer 19 is reduced to allow an unwanted sense current to flow in this portion so that the output is lowered.

The thickness of the antiferromagnetic layer 50 is set to 5 to 100 nm, preferably 5 to 80 nm, more preferably 5 to 50 nm, still more preferably 5 to 30 nm. If the thickness of the antiferromagnetic layer 50 becomes smaller than 5 nm, the exchange coupling magnetic field Hua and the blocking temperature Tb are rapidly reduced. On the other hand, in case of being thicker, it is not so serious. However, if it is too thick, a gap length (a shield-shield length) of the MR head is so increased that it is not suitable for the ultrahigh density magnetic recording. Thus, it is preferably less than 100 nm.

The ferromagnetic layer 40 is formed of a metal element such as Fe, Ni, Co, Mn, Cr, Dy, Er, Nd, Tb, Tm, Ce, Gd, alloy or compound containing the above metal element. Particularly, it is preferably formed of a composition expressed by $(Co_zNi_{1-z})_wFe_{1-w}$ ($0.4 \leq z \leq 1.0$, $0.5 \leq w \leq 1.0$ by weight). Out of the composition range as described above, no large electrical resistance change can be obtained.

The thickness of the ferromagnetic layer 40 as described above is set to 1.6 to 10 nm, and more preferably 2 to 6 nm. If this value is smaller than 1.6 nm, it loses the characteristic as the ferromagnetic layer. On the other hand, if the value exceeds 10 nm, the pinning force of the antiferromagnetic layer 50 is reduced, and thus the sufficient pinning effect of the spin of the ferromagnetic layer can not be obtained.

As described above, since the ferromagnetic layer 40 is in direct abutment with the antiferromagnetic layer 50, a direct interlayer interaction acts on each other, and the rotation of the magnetization of the ferromagnetic layer 40 is prevented. The ferromagnetic layer 40 is formed (deposited) while applying a magnetic field so as to obtain a desired pin direction.

On the other hand, with respect to the soft magnetic layer 20 as described later in detail, its magnetization can be freely rotated by a signal magnetic field from outside. As a result, a relative angle is produced in magnetization between the soft magnetic layer 20 and the ferromagnetic layer 40, so that a large MR effect due to the difference between the magnetization directions can be obtained.

The soft magnetic layer 20 is formed of Fe, Ni, Co or the like revealing soft magnetic characteristics, or alloy or compound containing these elements. The MR curve rises up more sharply by using the magnetic layer having a small coercive force Hc, and a favorable effect can be obtained. It is particularly preferable that the soft magnetic layer 20 has the following two-layer structure. Specifically, the soft magnetic layer 20 is formed as a two-layer laminate body comprising, from the side of the non-magnetic layer 30, a first soft magnetic layer and a second soft magnetic layer. The first soft magnetic layer is made of a simple substance of Co (cobalt) or an alloy containing Co no less than 80 weight %. The second soft magnetic layer has a composition expressed by $(Ni_xFe_{1-x})_yCo_{1-y}$ ($0.7 \leq x \leq 0.9$, $0.5 \leq y \leq 1.0$ by weight). With this arrangement, the first soft magnetic layer with Co being rich works as a diffusion blocking layer so as to prevent diffusion of Ni from the side of the second soft magnetic layer toward the non-magnetic metal layer 30. Further, since the first soft magnetic layer with Co being rich enhances the scattering of electrons, the MR ratio is improved. The second soft magnetic layer is formed within the foregoing composition range for maintaining the soft magnetic characteristic.

The thickness of the soft magnetic layer 20 as described above is set to 2 to 15 nm, preferably 3 to 15 nm, and more preferably 5 to 15 nm. If this value is smaller than 2 nm, no excellent characteristic as the soft magnetic layer can be obtained. On the other hand, if the value exceeds 15 nm, the total thickness of the multilayered film is large and the resistance of the whole magnetic multilayered film is increased, so that the MR effect is reduced. When the soft magnetic layer 20 is in the form of the foregoing two-layer laminate body, it is sufficient to set the thickness of the Co-rich first soft magnetic layer to be no less than 0.4 nm.

In order to conduct electrons efficiently, a metal having conductivity is preferably used for the non-magnetic metal layer which is interposed between the soft magnetic layer 20 and the ferromagnetic layer 40. More specifically, it may be formed of at least one selected from Au, Ag and Cu, alloy containing 60 weight % or more of at least one of these elements, or the like.

The thickness of the non-magnetic metal layer 30 is preferably set to 1.5 to 4 nm. If this value is smaller than 1.5 nm, the soft magnetic layer 20 and the ferromagnetic layer 40 which are disposed through the non-magnetic metal layer are exchange-coupled to each other, so that the spins of the soft magnetic layer 20 and the ferromagnetic layer 40 do not function independently of each other. If this value exceeds 4 nm, the rate of the electrons which are scattered at the interface between the soft magnetic layer 20 and the ferromagnetic layer 40 disposed at the upper and lower sides respectively is reduced, so that the MR ratio is reduced.

The protective layer 80 is normally provided to prevent oxidation of the surface of the magnetic multilayered film in a film-forming process and improve wettability with electrode material formed thereon and adhesive strength. The protective layer 80 is formed of Ti, Ta, W, Cr, Hf, Zr, Zn or the like. The thickness thereof is generally set to about 3 to 30 nm.

The substrate 15 is formed of glass, silicon, MgO, GaAs, ferrite, AlTiC, $CaTiO_3$ or the like, and the thickness thereof is generally set to about 0.5 to 10 nm.

The under layer 17 is formed of Ta, Hf, Cr or Zr. The thickness thereof is normally set to about 2 to 20 nm.

The material of each layer and the thickness thereof are specified as described above, and an external magnetic field is applied in a direction within the film surface as described later at the film formation time of at least the soft magnetic layer 20 to apply anisotropic magnetic field Hk of 2 to 20 Oe, preferably 2 to 16 Oe, and more preferably 2 to 10 Oe.

If the anisotropic magnetic field Hk of the soft magnetic layer is lower than 2 Oe, it is equal to the same degree of the coercive force, and no linear MR change curve can be substantially obtained in the vicinity of zero magnetic field, so that the characteristic as the MR element is deteriorated. On the other hand, if it is higher than 20 Oe, when this film is applied to the MR head or the like, the output is liable to be reduced and the resolution is reduced. The value Hk as described above can be obtained by applying the external magnetic field of 10 to 300 Oe at the film formation. If the external magnetic field is no greater than 10 Oe, it is too insufficient to induce Hk. On the other hand, if it exceeds 300 Oe, the effect is not improved although a coil must be designed in large size due to an occurrence of magnetic field. Therefore, the cost is increased and thus it is inefficient.

The magnetic multilayered film 1 may be repetitively laminated to form a magnetoresistance effect film. In this case, the repetitive lamination frequency n of the magnetic multilayered film is not limited to a specific value, and it may be suitably selected in accordance with a desired magnetoresistance ratio, etc. In order to satisfy the present requirement for ultrahigh densification of the magnetic recording, the smaller total film thickness of the magnetic multilayered film is better. However, if the film is thinner, the MR effect is usually reduced. The magnetic multilayered film of this invention can be used in practice to a sufficient level, even when the repetitive lamination frequency n is 1. Furthermore, as the lamination frequency is increased, the magnetoresistance ratio increases while productivity is lowered. If n is excessively large, the resistance of the whole element is excessively low, and it is practically inconvenient. Therefore, usually, n is preferably set to 10 or less. The preferable range of n is 1 to 5.

The film formation of each layer of the foregoing magnetic multilayered film 1 is preferably carried out by sputtering. Upon formation of the magnetic multilayered film 1, particularly, upon formation of the antiferromagnetic layer 50, an ultimate pressure in a vacuum film forming apparatus is set to $2\times10^{-9}$ Torr or less, preferably $8\times10^{-10}$ Torr or less, and more preferably $2\times10^{-10}$ Torr or less. The ultimate pressure is defined as a pressure in the film forming apparatus before the start of film formation, and differs from a pressure upon film formation.

The range of the ultimate pressure of no more than $2\times10^{-9}$ Torr is a range which has not been proposed in view of improving the film quality. For accomplishing the condition of the ultimate pressure of no more than $2\times10^{-9}$ Torr, what is not carried out in general is required with respect to a sputtering apparatus. Specifically, it is necessary that vacuum seal portions be all metal gaskets, that the apparatus be all formed of stainless steel or aluminum, that degassing be carried out at high temperature under vacuum upon assembling the apparatus, that, during the exhaust operation, the whole vacuum vessel be baked to high temperatures so as to thoroughly and forcibly discharge residual gas and $H_2O$, and that an exhaust pump operable under $2\times10^{-9}$ Torr or less be used.

For forming the antiferromagnetic layer 50, the concentration of oxygen contained in a target used in the sputtering is set to 1 to 600 atomic ppm, preferably 1 to 500 atomic ppm, and more preferably 1 to 300 atomic ppm. The oxygen concentration of the target is derived through analysis using the amount of $CO_2$ gas produced by burning a portion of the target. Further, the total concentration of impurities (for example, $H_2O$, $CO_2$ and He) in the sputtering gas introduced upon sputtering is set to 0.1 to 100 atomic ppb, preferably 0.1 to 50 atomic ppb, more preferably 0.1 to 10 atomic ppb, and still more preferably 0.1 to 5 atomic ppb. Particularly, the $H_2O$ impurity concentration in the sputtering gas is liable to influence the film quality and is desired to be set to no more than 40 atomic ppb, preferably no more than 10 atomic ppb, and more preferably no more than 5 atomic ppb. An operating pressure in the vacuum film forming apparatus during the actual film formation is normally set to $1\times10^{-4}$ to $1\times10^{-2}$ Torr.

It is preferable that the film formation of the respective layers of the magnetic multilayered film 1 in the present invention is carried out according to the foregoing film forming conditions for further improving the characteristic of the magnetoresistance effect film.

As the substrate 15, glass, silicon, MgO, GaAs, ferrite, AlTiC, $CaTiO_3$ or the like may be used. For the film formation, it is preferable that an external magnetic field of 10 to 300 Oe is applied in one direction within the film plane at the film formation of the soft magnetic layer 20. With this operation, the anisotropic magnetic field Hk can be provided to the soft magnetic layer 20. The application of the external magnetic field may be performed at only the film formation time of the soft magnetic field, for example, using a device which is equipped with an electromagnet or the like which is capable of easily controlling an application timing of the magnetic field, and no external magnetic field is applied at the film formation time of the antiferromagnetic layer 50. Alternatively, a method of applying a constant magnetic field at the film formation time at all times may be used.

As described above, by applying the external magnetic field in one direction within the film plane at least upon film formation of the soft magnetic layer 20 to induce the anisotropic magnetic field Hk, the high frequency characteristic can be further improved.

Furthermore, in the multilayered film structure of the antiferromagnetic layer 50 bottom type, when forming the antiferromagnetic layer 50, the magnetic field is preferably applied in a direction perpendicular to the direction of the magnetic field applied upon film formation of the soft magnetic film 20. Specifically, it is applied within the film plane of the magnetic multilayered film and in a direction orthogonal to the measurement current (so-called orthogonalization process). The magnitude of the applied magnetic field is preferably set in the range of 10 to 300 Oe. By carrying out the laser irradiation crystallization treatment (laser annealing) of the present invention (the magnetic field is also applied during the laser irradiation crystallization treatment), the magnetization direction of the ferromagnetic layer 40 stacked on the antiferromagnetic layer 50 is surely fixed in the applied magnetic field direction (direction perpendicular to the measurement current) by the antiferromagnetic layer 50, whereby the magnetization of the ferromagnetic layer can be most reasonably set to be antiparallel to the magnetization of the soft magnetic layer 20 whose direction can be freely changed by the signal magnetic field. The magnetic field for orthogonalization is also applied upon formation of the ferromagnetic layer 40.

On the other hand, in the multilayered film structure of the antiferromagnetic layer 50 top type, when forming the ferromagnetic player 40, the magnetic field is preferably applied in a direction perpendicular to the direction of the magnetic field applied upon film formation of the soft magnetic film 20 like the bottom type. Specifically, it is applied within the film plane of the magnetic multilayered film and in a direction orthogonal to the measurement current (so-called orthogonalization process). The magnitude of the applied magnetic field is preferably set in the range of 10 to 300 Oe. Thereafter, upon or after forming the antiferromagnetic layer 50 on the ferromagnetic layer 40, the laser irradiation crystallization treatment (laser annealing) of the present invention is carried out (the magnetic field is also applied during the laser irradiation crystallization treatment). Like the bottom type, the formation of the antiferromagnetic layer 50 is carried out while applying the magnetic field in the same direction as that upon forming the ferromagnetic layer 40.

The magnetoresistance effect film having the magnetic multilayered film as described in each of the foregoing carrying-out modes is applied to a magnetoresistance effect type head (MR head), an MR sensor, a ferromagnetic memory element, an angle sensor or the like.

Hereinbelow, explanation will be given to an example where the magnetoresistance effect film 2 (FIG. 1) is applied to the magnetoresistance effect type head. As the magnetoresistance effect type head in the present invention, a spin valve head having a magnetic multilayered film revealing the giant magnetoresistance effect (GMR) may be cited as a preferred example.

Hereinbelow, the spin valve head will be picked up as the magnetoresistance effect type head (MR head) and given explanation.

Figure 7:
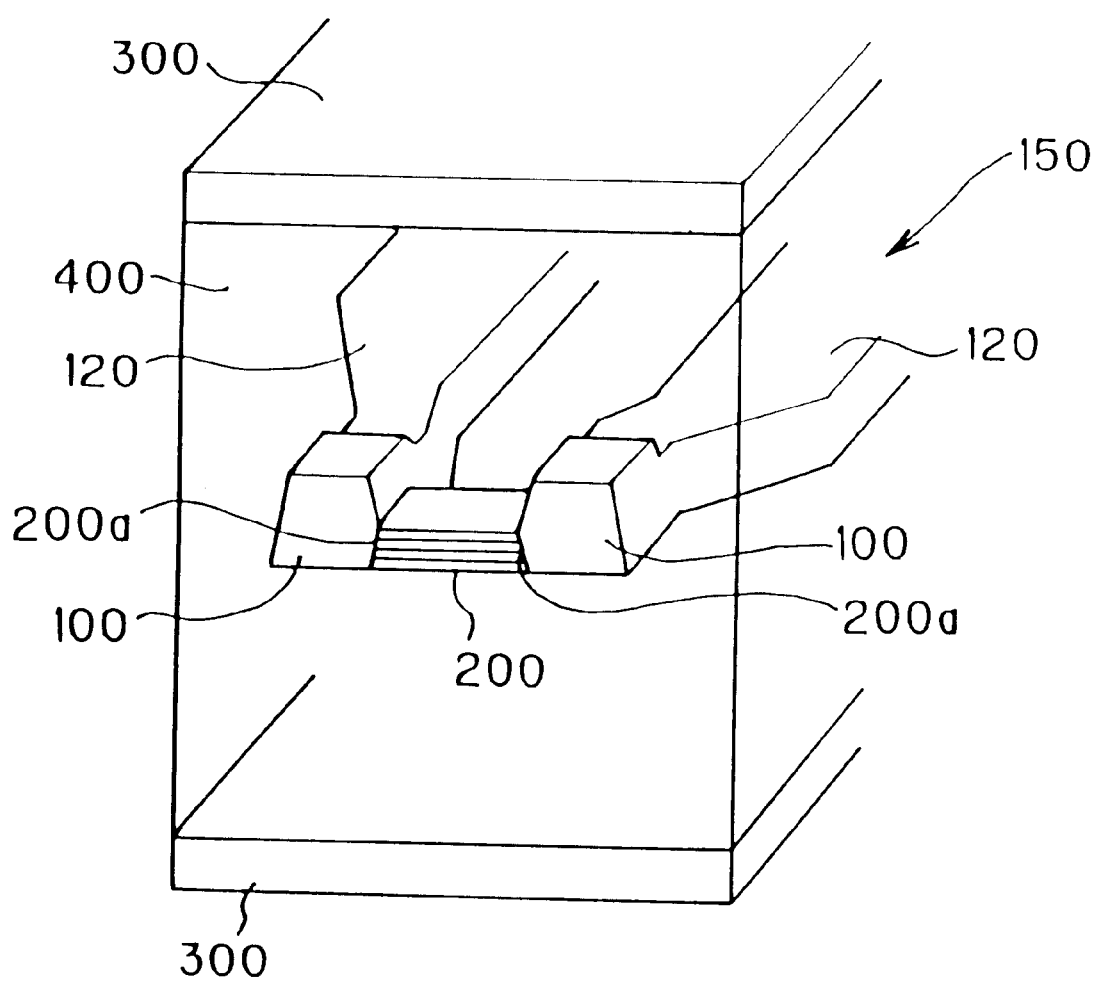
FIG. 7 is a schematic perspective view showing an example of a magnetoresistance effect type head according to the present invention.

As shown in FIG. 7, a magnetoresistance effect type head (MR head) 150 includes a magnetoresistance effect film 200 serving as a magnetically-sensitive portion for magnetically sensing a signal magnetic field, and electrode portions 100, 100 which are formed at both end portions 200a, 200a of the magnetoresistance effect film 200. Preferably, the whole both end portions 200a, 200a of the magnetoresistance effect film 200 serving as the magnetically-sensitive portion are connected to the electrode portions 100, 100. Conductive films 120, 120 are electrically conducted to the magnetoresistance effect film 200 through the electrode portions 100, 100. In this invention, the conductive film 120 and the electrode portion 100 are individually shown to simplify the description which will be made later, while in most cases the conductive film 120 and the electrode portion 100 are formed integral with each other by a thin film forming method. Accordingly, these elements may be considered as being formed of one member.

The magnetoresistance effect film 200 serving as the magnetically-sensitive portion of the MR head has substantially the same laminate structure as the magnetoresistance effect film 2 having the magnetic multilayered film 1 shown in FIG. 1. That is, the magnetoresistance effect film 200 is substantially replaced by the magnetoresistance effect film 2 having the magnetic multilayered film shown in FIG. 1, so that the magnetoresistance effect film 200 includes a non-magnetic metal layer 30, a ferromagnetic layer 40 formed on one surface of the non-magnetic metal layer 30, a soft magnetic layer 20 formed on the other surface of the non-magnetic metal layer 30, an antiferromagnetic layer 50 which is formed on a surface of the ferromagnetic layer 40 remote from the other surface thereof abutting the non-magnetic metal layer 30 so as to pin the direction of magnetization of the ferromagnetic layer 40 and, as a more preferable structure, an antiferromagnetization promote layer 19 which is formed on a surface of the antiferromagnetic layer 50 remote from the other surface thereof abutting the ferromagnetic layer 40.

The magnetoresistance effect film 200 exhibits the so-called spin-valve type magnetoresistance change. The spin-valve type magnetoresistance change represents that, in the magnetic multilayered film having the non-magnetic metal layer 30, the ferromagnetic layer 40 formed on one surface of the non-magnetic metal layer 30, the soft magnetic layer 20 formed on the other surface of the non-magnetic metal layer 30 and the antiferromagnetic layer 50 formed on the ferromagnetic layer for pinning the magnetization direction of the ferromagnetic layer 40, an angle formed between the spin of the soft magnetic layer 20 and the spin of the pinned ferromagnetic layer 40 is set to approximately 90 degrees in an acute angle when the external signal magnetic field is zero. In practice, the angle may be 45 to 90 degrees, and most preferably 90 degrees (orthogonalization of magnetization) for causing the magnetoresistance effect curve (MR curve) to be asymmetrical relative to the plus and minus external magnetic fields with respect to the zero external magnetic field.

As shown in FIG. 7, in the magnetoresistance effect type head (MR head) 150, shield layers 300, 300 are formed so as to sandwich the magnetoresistance effect film 200 and the electrode portions 100, 100 at the upper and lower sides, and a non-magnetic insulation layer 400 is formed at a portion between the magnetoresistance effect film 200 and the shield layers 300, 300.

The same materials and thicknesses as described in the foregoing carrying-out mode of the magnetic multilayered film are preferably used for the ferromagnetic layer 40, the non-magnetic metal layer 30, the soft magnetic layer 20, the antiferromagnetic layer 50 and the antiferromagnetization promote layer 19 (used as a more preferable structure) used in the magnetoresistance effect film 200 as the magnetically-sensitive portion.

As shown in FIG. 7, the current-flowing electrode portions 100 are arranged so that both end portions 200a, 200a of the magnetoresistance effect film 200 are wholly contacted with the electrode portions 100 in the laminate direction of the magnetoresistance effect film 200. Then, the electrons intensively flow through the portion sandwiched between the soft magnetic layer 20 and the ferromagnetic layer 40. At this time, the electrons are magnetically scattered in accordance with the spin directions of the soft magnetic layer 20 and the ferromagnetic layer 40, so that the resistance is greatly varied. Accordingly, a fine change of the external magnetic field can be detected as a large change of electrical resistance.

Figure 8:
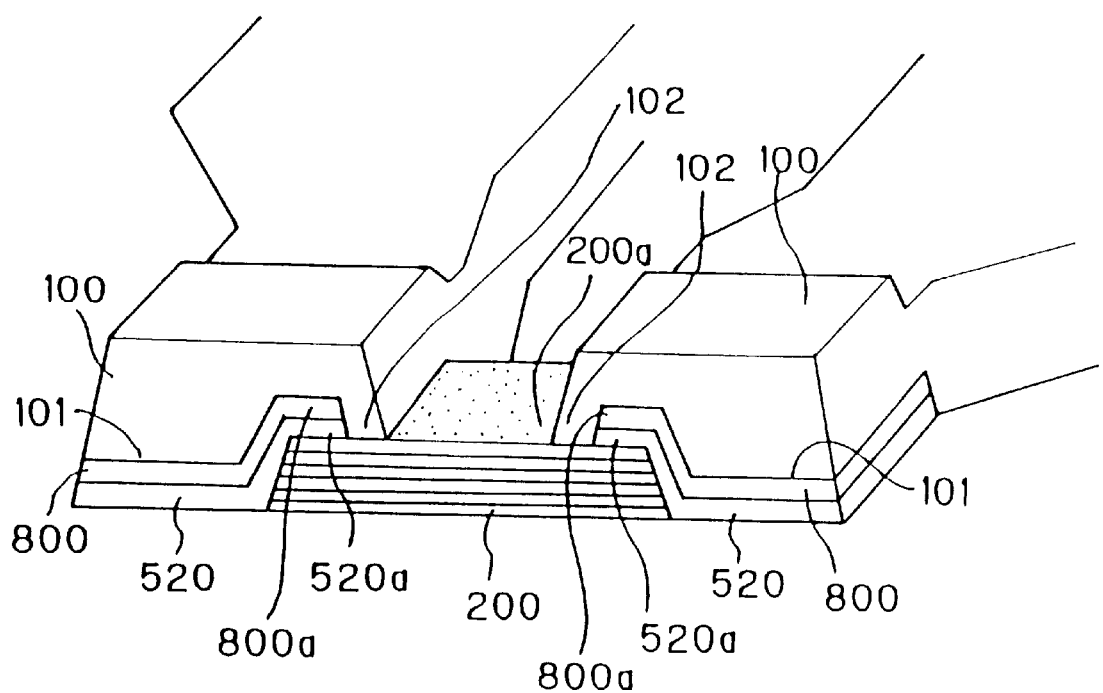
FIG. 8 is a schematic perspective view showing a preferred connection state between a magnetoresistance effect film and electrode portions of a magnetoresistance effect type head according to the present invention.

It is particularly preferable that the MR head having the spin valve film of the present invention has a head structure as shown in FIG. 8. Specifically, between the magnetoresistance effect film 200 working as a magnetically-sensitive portion and the electrode portions 100 for conducting the measurement current, linking soft magnetic layers 520 and antiferromagnetic layers 800 (or hard magnetic layer 800) are interposed in order from the side of the magnetoresistance effect film 200 as shown in the drawing. Further, the linking soft magnetic layer 520 and the antiferromagnetic layer 800 (or hard magnetic layer 800) are formed such that their one end side covers a portion of an upper side 200a (near the soft magnetic layer) of the magnetoresistance effect film 200 and their other end side gets under a lower surface 101 of the electrode portion 100 as shown in the drawing. Further, an end portion 102, located at the head center side, of the electrode portion 100 is formed so as to cover a portion of the upper side 200a (near the soft magnetic layer) of the magnetoresistance effect film 200 and also cover upper end portions 520a, 800a of the linking soft magnetic layer 520 and the antiferromagnetic layer 800, respectively. The linking soft magnetic layer 520 is about 10nm in thickness and made of, for example, NiFe, NiFeCr, NiFeRh, NiFeRu, CoZrNb, FeAlSi and FeZrN. The antiferromagnetic layer 800 is about 50 nm in thickness and made of, for example, $Ru_5Rh_{15}Mn$, NiMn, FeMn, PtMn and $\alpha\text{-}Fe_2O_3$. The hard magnetic layer 800 is about 50 nm in thickness and made of, for example, CoPt and CoPtCr.

With such an arrangement, through effects of both the linking soft magnetic layers 520 and the antiferromagnetic layers 800 formed at the magnetoresistance effect film 200, the longitudinal bias can be given quite efficiently so that the MR head which can suppress the Barkhausen noises can be achieved. Further, since the end portions 102 of the electrode portions 100 are formed so as to cover the magnetoresistance effect film 200, the MR head can be provided wherein the signal magnetic field is not lowered at the end portions of the element, and further, the formation of narrow track width, such as no greater than 1 µm, is easy.

The invention of the foregoing magnetoresistance effect film and the invention of the magnetoresistance effect type head using such a magnetoresistance effect film will be explained in further detail based on the following concrete experimental examples:

EXAMPLE I
(Preparation of Inventive Sample I-1)

A spin valve (SV) type magnetoresistance effect film forming the main part of a spin valve type magnetoresistance effect type head was prepared in the following manner. Specifically, the spin valve type magnetoresistance effect film (Inventive Sample I-1) was prepared by stacking, on a substrate 15 (AlTiC with $Al_2O_3$), an under layer 17 (Ta; 2 nm in thickness), an antiferromagnetization promote layer 19 (Ph; 2 nm in thickness), an antiferromagnetic layer 50 ($Pt_{48}Mn_{52}$; 15 nm in thickness) as a pinning layer, a ferromagnetic layer 40 (Co; 3 nm in thickness), a non-magnetic metal layer 30 (Cu; 3 nm in thickness), a soft magnetic layer 20 ((Co; 1 nm in thickness)+(NiFe; 6 nm in thickness)) and a protective layer 80 (Ta; 5 nm in thickness) in the order named.

The sample was formed by a sputtering method using a vacuum film forming apparatus, under the sputtering condition that the ultimate pressure in the vacuum film forming apparatus was set to $8\times10^{-10}$ Torr. During the formation of the magnetoresistance effect film, laser irradiation was applied to the film surface of the antiferromagnetic layer 50 as the pinning layer upon completion of the formation thereof so as to crystallize the antiferromagnetic layer 50, so that the antiferromagnetization of the antiferromagnetic layer was realized. Thereafter, the ferromagnetic layer 40 was formed in the magnetic field by applying the induced magnetic field in a fixed direction. The laser irradiation was carried out by the raster scan method, wherein the irradiation energy was set to 800 mJ and the frequency to 10 cycle/sec. The magnetic field treatment for orthogonalization was also implemented upon formation of the antiferromagnetic layer 50 and upon crystallization treatment by the laser irradiation.

(Preparation of Inventive Sample I-2)

In Inventive Sample I-1, a manner of laser irradiation used in crystallization treatment of the antiferromagnetic layer was changed. Specifically, the crystallization treatment of the antiferromagnetic layer was carried out by applying the laser irradiation to a deposit deposited with a lapse of time during the formation of the antiferromagnetic layer. Other than that, Inventive Sample I-2 was prepared like Inventive Sample I-1.

(Preparation of Inventive Sample I-3)

In Inventive Sample I-1, the antiferromagnetization promote layer 19 (Ph; 2 nm in thickness) was not formed. Further, the thickness of the antiferromagnetic layer 50 was changed from 15 nm to 20 nm. Other than that, Inventive Sample I-3 was prepared like Inventive Sample I-1.

(Preparation of Inventive Sample I-4)

In Inventive Sample I-2, the antiferromagnetization promote layer 19 (Ph; 2 nm in thickness) was not formed. Further, the thickness of the antiferromagnetic layer 50 was changed from 15 nm to 20 nm. Other than that, Inventive Sample I-4 was prepared like Inventive Sample I-2.

(Preparation of Inventive Sample I-5)

A spin valve (SV) type magnetoresistance effect film forming the main part of a spin valve type magnetoresistance effect type head was prepared in the following manner. Specifically, the spin valve type magnetoresistance effect film (Inventive Sample I-5) was prepared by stacking, on a substrate 15 (AlTiC with $Al_2O_3$), an under layer 17 (Ta; 2 nm in thickness), a soft magnetic layer 20 (NiFe; 7 nm in thickness), a non-magnetic metal layer 30 (Cu; 3 nm in thickness), a ferromagnetic layer 40 (Co; 3 nm in thickness), an antiferromagnetic layer 50 ($Pt_{48}Mn_{52}$; 20 nm in thickness) as a pinning layer, and a protective layer 80 (Ta; 5 nm in thickness) in the order named.

The sample was formed by a sputtering method using a vacuum film forming apparatus, under the sputtering condition that the ultimate pressure in the vacuum film forming apparatus was set to $8\times10^{-10}$ Torr. During the formation of the magnetoresistance effect film, after the ferromagnetic layer 40 was formed in the magnetic field by applying the induced magnetic field in a fixed direction, laser irradiation was applied to the film surface of the antiferromagnetic layer 50 as the pinning layer upon completion of the formation thereof so as to crystallize the antiferromagnetic layer 50, so that the antiferromagnetization of the antiferromagnetic layer was realized. The laser irradiation was carried out by the raster scan method, wherein the irradiation energy was set to 500 mJ and the frequency to 30 cycle/sec. The magnetic field treatment for orthogonalization was also implemented upon formation of the antiferromagnetic layer 50 and upon crystallization treatment by the laser irradiation.

(Preparation of Inventive Sample I-6)

In Inventive Sample I-5, a manner of laser irradiation used in crystallization treatment of the antiferromagnetic layer was changed. Specifically, the crystallization treatment of the antiferromagnetic layer was carried out by applying the laser irradiation to a deposit deposited with a lapse of time during the formation of the antiferromagnetic layer. Other than that, Inventive Sample I-6 was prepared like Inventive Sample I-5.

(Preparation of Inventive Sample I-7)

In Inventive Sample I-1, the material and the thickness of the antiferromagnetic layer 50 as the pinning layer were changed to $Ni_{48}Mn_{52}$ and 17 nm, respectively. Other than that, Inventive Sample I-7 was prepared like Inventive Sample I-1.

(Preparation of Inventive Sample I-8)

In Inventive Sample I-5, the material and the thickness of the antiferromagnetic layer 50 as the pinning layer were changed to $Ni_{48}Mn_{52}$ and 17 nm, respectively. Other than that, Inventive Sample I-8 was prepared like Inventive Sample I-5.

(Preparation of Inventive Sample I-9)

In Inventive Sample I-7, the antiferromagnetization promote layer 19 (Ph; 2 nm in thickness) was not formed. Other than that, Inventive Sample I-9 was prepared like Inventive Sample I-7.

(Preparation of Inventive Sample I-10)

In Inventive Sample I-1, the material and the thickness of the antiferromagnetic layer 50 as the pinning layer were changed to $Pt_{38}Mn_{52}Rh_{10}$ and 20 nm, respectively. Other than that, Inventive Sample I-10 was prepared like Inventive Sample I-1.

(Preparation of Inventive Sample I-11)

In Inventive Sample I-10, the material of the antiferromagnetic layer 50 as the pinning layer was changed to $Pt_{38}Mn_{52}Cr_{10}$. Other than that, Inventive Sample I-11 was prepared like Inventive Sample I-10.

(Preparation of Inventive Sample I-12)

In Inventive Sample I-10, the material of the antiferromagnetic layer 50 as the pinning layer was changed to $Pt_{38}Mn52Pd_{10}$. Other than that, Inventive Sample I-12 was prepared like Inventive Sample I-10.

(Preparation of Comparative Sample I-1)

In Inventive Sample I-1, the laser irradiation for crystallization of the antiferromagnetic layer 50 was not carried out. Instead, after formation of a spin valve type laminate film, the whole laminate film was subjected to a heat treatment (annealing) at 260° C. for 5 hours so as to crystallize an antiferromagnetic layer 50, and was then gradually cooled in the magnetic field for about 15 hours to carry out pinning of the ferromagnetic layer 40 (orthogonalization process) Other than that, Comparative Sample I-1 was prepared like Inventive Sample I-1.

(Preparation of Comparative Sample I-2)

In Inventive Sample I-5, the laser irradiation for crystallization of the antiferromagnetic layer 50 was not carried out. Instead, after formation of a spin valve type laminate film, the whole laminate film was subjected to a heat treatment (annealing) at 260° C. for 5 hours so as to crystallize an antiferromagnetic layer 50, and was then gradually cooled in the magnetic field for about 15 hours to carry out pinning of the ferromagnetic layer 40 (orthogonalization process). Other than that, Comparative Sample I-2 was prepared like Inventive Sample I-5.

(Preparation of Comparative Sample I-3)

In Inventive Sample I-7, the laser irradiation for crystallization of the antiferromagnetic layer 50 was not carried out. Instead, after formation of a spin valve type laminate film, the whole laminate film was subjected to a heat treatment (annealing) at 260° C. for 5 hours so as to crystallize an antiferromagnetic layer 50, and was then gradually cooled in the magnetic field for about 15 hours to carry out pinning of the ferromagnetic layer 40 (orthogonalization process). Other than that, Comparative Sample I-3 was prepared like Inventive Sample I-7.

(Preparation of Comparative Sample I-4)

In Inventive Sample I-10, the laser irradiation for crystallization of the antiferromagnetic layer 50 was not carried out. Instead, after formation of a spin valve type laminate film, the whole laminate film was subjected to a heat treatment (annealing) at 260° C. for 5 hours so as to crystallize an antiferromagnetic layer 50, and was then gradually cooled in the magnetic field for about 15 hours to carry out pinning of the ferromagnetic layer 40 (orthogonalization process). Other than that, Comparative Sample I-4 was prepared like Inventive Sample I-10.

(Preparation of Comparative Sample I-5)

In Inventive Sample I-11, the laser irradiation for crystallization of the antiferromagnetic layer 50 was not carried out. Instead, after formation of a spin valve type laminate film, the whole laminate film was subjected to a heat treatment (annealing) at 260° C. for 5 hours so as to crystallize an antiferromagnetic layer 50, and was then gradually cooled in the magnetic field for about 15 hours to carry out pinning of the ferromagnetic layer 40 (orthogonalization process). Other than that, Comparative Sample I-5 was prepared like Inventive Sample I-11.

(Preparation of Comparative Sample I-6)

In Inventive Sample I-12, the laser irradiation for crystallization of the antiferromagnetic layer 50 was not carried out. Instead, after formation of a spin valve type laminate film, the whole laminate film was subjected to a heat treatment (annealing) at 260° C. for 5 hours so as to crystallize an antiferromagnetic layer 50, and was then gradually cooled in the magnetic field for about 15 hours to carry out pinning of the ferromagnetic layer 40 (orthogonalization process). Other than that, Comparative Sample I-6 was prepared like Inventive Sample I-12.

With respect to each of the samples thus prepared, the MR ratio and the exchange coupling energy Jk were derived in the following manner:

MR Ratio

A measurement sample of 0.4×6 mm was prepared, and resistances were measured according to a four-terminal method while applying an external magnetic field in a direction perpendicular to the current within the film plane and changing it from −300 to 300 Oe. The MR ratio ΔR/R was derived from the measured resistances. Specifically, the MR ratio ΔR/R was calculated using the following equation.

$$\Delta R/R = (\rho max - \rho sat) \times 100/\rho sat \ (\%)$$

wherein ρmax represents the maximum resistivity and ρsat represents the minimum resistivity.

Exchange Coupling Energy Jk

Figure 9:
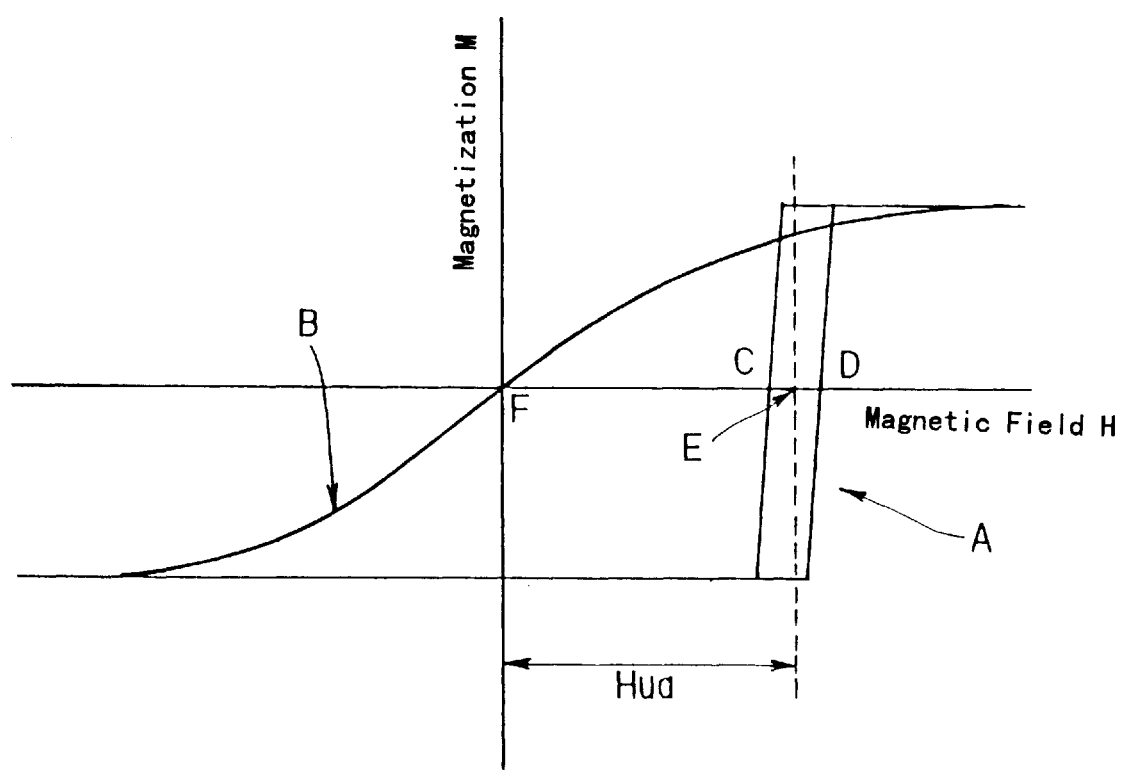
FIG. 9 is a diagram showing an M-H loop according to the present invention.

Magnetization curves were described in a magnetic field of 1KOe using a vibration sample type magnetometer (VSM), then the exchange coupling magnetic field Hua and the saturation flux density Ms of the ferromagnetic layer 40 were derived from such magnetization curves, and then the exchange coupling energy Jk was derived using those values. The exchange coupling magnetic field Hua is defined as a magnetic field, for example, at point E (middle point between point C and point D) shifting from the origin F in the magnetization curves as shown in FIG. 9. In FIG. 9, a magnetization curve A shows a magnetization easy axis direction (direction in which the magnetic field was applied upon film formation), and a magnetization curve B shows a magnetization hard axis direction.

The MR ratio and the exchange coupling energy Jk measured with respect to each of the samples are shown in Table 1 below.

TABLE 1

| Sample No. | Antiferromagnetic layer material | thickness (nm) | Position of antiferro-magnetic layer | Antiferro-magnetization promote layer | Crystallization method of antiferromagnetic layer | MR ratio (%) | Jk (erg/cm$^2$) |
|---|---|---|---|---|---|---|---|
| Inventive example I-1 | PtMn | 15 | Bottom | Rh | laser irradiation I | 9.2 | 0.48 |
| Inventive example I-2 | PtMn | 15 | Bottom | Rh | laser irradiation II | 8.9 | 0.46 |
| Inventive example I-3 | PtMn | 20 | Bottom | none | laser irradiation I | 8.1 | 0.45 |
| Inventive example I-4 | PtMn | 20 | Bottom | none | laser irradiation II | 7.9 | 0.43 |
| Inventive example I-5 | PtMn | 20 | Top | none | laser irradiation I | 7.7 | 0.42 |
| Inventive example I-6 | PtMn | 20 | Top | none | laser irradiation II | 7.5 | 0.38 |
| Inventive example I-7 | NiMn | 17 | Bottom | Rh | laser irradiation I | 8.2 | 0.46 |
| Inventive example I-8 | NiMn | 17 | Top | Rh | laser irradiation I | 7.9 | 0.43 |
| Inventive example I-9 | NiMn | 17 | Bottom | none | laser irradiation I | 7.6 | 0.43 |
| Inventive example I-10 | PtMnRh | 20 | Bottom | Rh | laser irradiation I | 8.8 | 0.42 |
| Inventive example I-11 | PtMnCr | 20 | Bottom | Rh | laser irradiation I | 8.5 | 0.41 |
| Inventive example I-12 | PtMnPd | 20 | Bottom | Rh | laser irradiation I | 8.3 | 0.42 |
| Comparative example I-1 | PtMn | 15 | Bottom | Rh | conventional method | 6.8 | 0.33 |
| Comparative example I-2 | PtMn | 20 | Top | none | conventional method | 6.2 | 0.30 |
| Comparative example I-3 | NiMn | 17 | Bottom | none | conventional method | 6.1 | 0.30 |
| Comparative example I-4 | PtMnRh | 20 | Bottom | Rh | conventional method | 6.9 | 0.35 |
| Comparative example I-5 | PtMnCr | 20 | Bottom | Rh | conventional method | 6.3 | 0.29 |
| Comparative example I-6 | PtMnPd | 20 | Bottom | Rh | conventional method | 6.3 | 0.29 |

Laser Irradiation I: method of applying laser irradiation to a film surface of an antiferromagnetic layer after formation thereof.
Laser Irradiation II: method of applying laser irradiation to a deposit during formation of an antiferromagnetic layer.
Conventional Method: method of, after formation of a spin valve film laminate body, applying a heat treatment (annealing) to the whole laminate body.

From the results shown in Table 1, it is seen that when comparing the inventive samples and the comparative samples using the same film structure as a basis, the MR ratios of the inventive samples are higher than those of the comparative samples by as many as 1.3 to 2.4%. It is further seen that the exchange coupling energy Jk of the inventive samples is higher by as many as 0.08 to 0.15 erg/cm$^2$. Thus, it is seen that the inventive samples each with the antiferromagnetic layer 50 subjected to the laser irradiation to be crystallized are higher in exchange coupling energy Jk and smaller in deterioration of the MR ratio. Further, by observing differences between the states of laminate sections of the inventive samples and the states of laminate sections of the comparative samples using a transmission electron microscope, it was confirmed that boundary film surfaces of the stacked layers of the inventive samples were clearly divided as compared with those of the comparative samples.

EXAMPLE II

Figure 10:
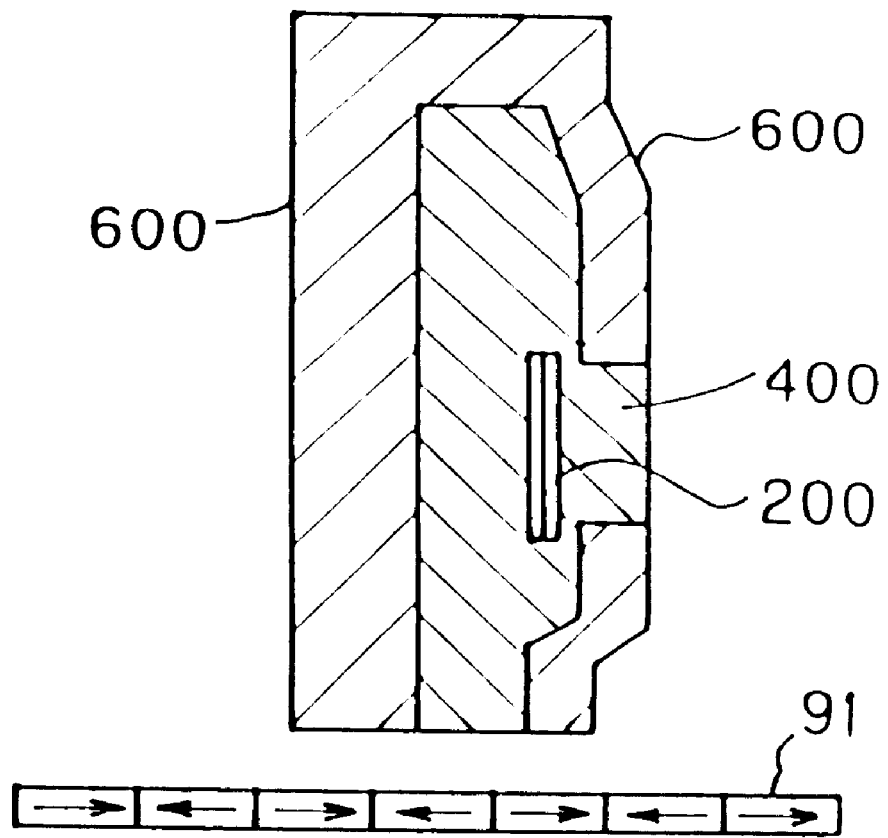
FIG. 10 is a partially omitted sectional view showing an example, wherein a magnetoresistance effect film (magnetic multilayered film) according to the present invention is applied to a yoke-type MR head.

FIG. 10 shows an example in which the magnetoresistance effect film of the present invention is applied to a yoke-type MR head. In this example, a cutout is formed at a portion of yokes 600, 600, and a magnetoresistance effect film 200 is formed therebetween via a thin insulation film 400. The magnetoresistance effect film 200 is provided with electrodes (not shown) for feeding a current in a direction parallel to or perpendicular to a magnetic path formed by the yokes 600, 600.

EXAMPLE III

Figure 11:
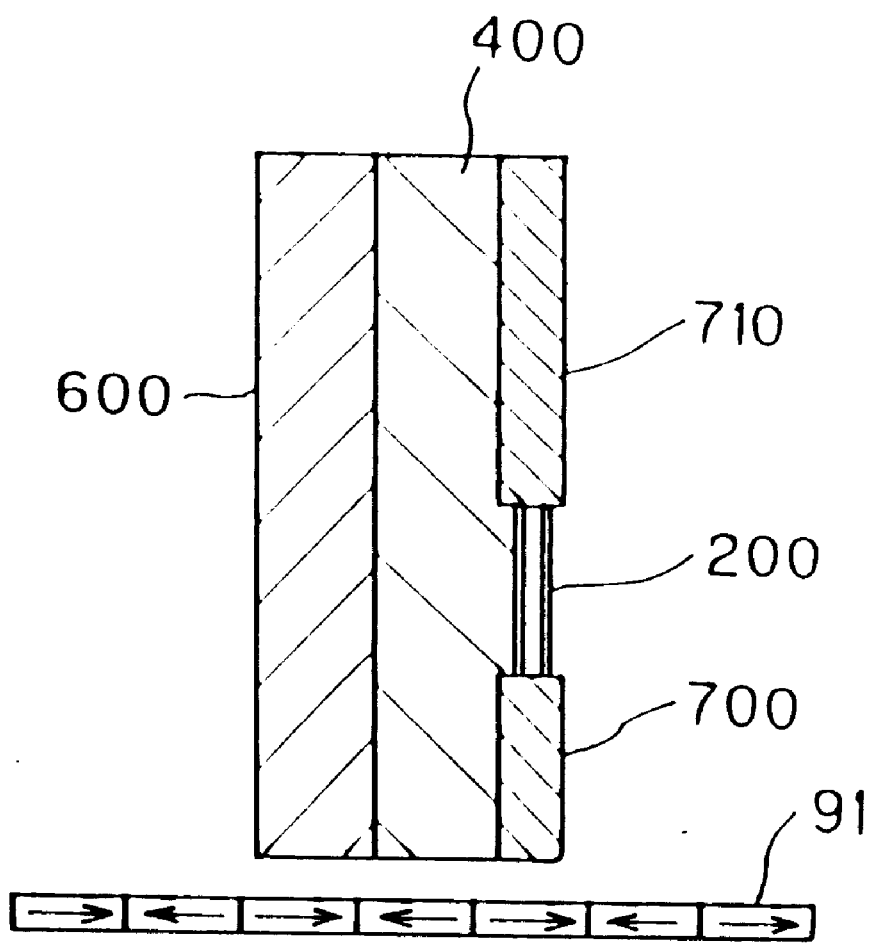
FIG. 11 is a partially omitted sectional view showing an example, wherein a magnetoresistance effect film (magnetic multilayered film) according to the present invention is applied to a flux guide type MR head.

FIG. 11 shows an example in which the magnetoresistance effect film of the present invention is applied to a flux guide type MR head. In this example, a magnetoresistance effect film 200 is magnetically coupled to flux guide layers 700 and 710 of high resistivity and high permeability. The flux guide layers 700 and 710 indirectly conduct a signal magnetic field to the magnetoresistance effect film 200. Further, via a non-magnetic insulation layer 400, a flux back guide layer 600 (escape path for magnetic flux passing the magnetoresistance effect film 200) is formed. Flux back guide layers 600 may be provided at both sides the magnetoresistance effect film 200 via the non-magnetic insulation layer 400. A feature of this head resides in that a magnetic field detecting portion thereof can approximate a recording medium in a nearly abutting fashion so that the high output can be obtained.

From the foregoing results, the effect of the present invention is clear. Specifically, the present invention relates to a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, and an antiferromagnetic layer which is formed on a surface of the ferromagnetic layer remote from the other surface thereof abutting the non-magnetic metal layer so as to pin a direction of magnetization of the ferromagnetic layer, wherein the antiferromagnetic layer is made of a compound containing Mn and having a CuAu-I type regular crystal structure and is crystallized by laser irradiation to show antiferromagnetism. Thus, the excellent effect is achieved that mutual diffusion in the laminate film is very small and the MR ratio is very large. Further, when a spin valve head is formed, the excellent effect is achieved that the sensitivity is high and the output is large. Further, the laminate film forming the spin valve film can be reduced in thickness so that a product can be more compact. Moreover, the excellent effect is achieved that the energy loss is small and the productivity is high.

What is claimed is:

1. A spin valve magnetoresistance effect film comprising a multilayered film including a non-magnetic metal layer, a ferromagnetic layer formed on one surface of said non-magnetic metal layer, a soft magnetic layer formed on the other surface of said non-magnetic metal layer, and an antiferromagnetic layer which is formed on a surface of said ferromagnetic layer remote from the other surface of said ferromagnetic layer abutting said non-magnetic metal layer so as to pin a direction of magnetization of said ferromagnetic layer, wherein said antiferromagnetic layer is made of a compound containing Mn and having a CuAu-I regular crystal structure, and wherein said antiferromagnetic layer is subjected to a crystallization treatment by laser irradiation so as to exhibit antiferromagnetism.

2. The magnetoresistance effect film according to claim 1, wherein said crystallization treatment of the antiferromagnetic layer is carried out by applying the laser irradiation to a film surface of the antiferromagnetic layer upon completion of formation of the antiferromagnetic layer.

3. The magnetoresistance effect film according to claim 2, wherein said antiferromagnetic layer is formed on a substrate and the laser irradiation is applied to the film surface of the antiferromagnetic layer to crystallize the antiferromagnetic layer so as to manifest an antiferromagnetic characteristic, and wherein said ferromagnetic layer, said non-magnetic metal layer and said soft magnetic layer are formed in the order named on said antiferromagnetic layer applied with the laser irradiation.

4. The magnetoresistance effect film according to claim 2, wherein said soft magnetic layer, said non-magnetic metal layer, said ferromagnetic layer and said antiferromagnetic layer are formed on a substrate in the order named, and wherein the laser irradiation is applied to the film surface of said antiferromagnetic layer to crystallize the antiferromagnetic layer so as to manifest an antiferromagnetic characteristic.

5. The magnetoresistance effect film according to claim 1, wherein said crystallization treatment of the antiferromagnetic layer is carried out while applying the laser irradiation to the antiferromagnetic layer during deposition of the antiferromagnetic layer.

6. The magnetoresistance effect film according to claim 5, wherein the laser irradiation is applied to said antiferromagnetic layer during deposition of the antiferromagnetic layer on a substrate to crystallize the antiferromagnetic layer so as to manifest an antiferromagnetic characteristic, and wherein said ferromagnetic layer, said non-magnetic metal layer and said soft magnetic layer are formed in the order named on said antiferromagnetic layer applied with the laser irradiation.

7. The magnetoresistance effect film according to claim 5, wherein after forming said soft magnetic layer, said non-magnetic metal layer and said ferromagnetic layer on a substrate, the laser irradiation is applied to said antiferromagnetic layer during deposition of the antiferromagnetic layer to crystallize the antiferromagnetic layer so as to manifest an antiferromagnetic characteristic.

8. The magnetoresistance effect film according to claim 1, wherein said crystallization treatment by the laser irradiation is carried out in a vacuum film forming apparatus.

9. The magnetoresistance effect film according to claim 1, wherein said antiferromagnetic layer is made of PtMn or an alloy containing PtMn at least no less than 80 at %, or made of NiMn or an alloy containing NiMn at least no less than 80 at %.

10. The magnetoresistance effect film according to claim 1, wherein an antiferromagnetization promote layer is formed on a substrate directly or on a surface of an under layer, the other surface of the under layer abutting the substrate, and said antiferromagnetic layer, said ferromagnetic layer, said nonmagnetic metal layer and said soft magnetic layer are formed on said antiferromagnetization promote layer in the order named, and wherein said antiferromagnetization promote layer is made of at least one selected from Ir, Pd, Pt, Rh, Ru, Re, Os, Al, Cu, Au and Ag.

11. The magnetoresistance effect film according to claim 10, wherein said antiferromagnetic layer is made of PtMn or an alloy containing PtMn at least no less than 80 at %, and wherein said antiferromagnetization promote layer is made of at least one selected from Ir, Pd, Pt, Rh, Ru, Re, Os, Al, Cu, Au and Ag.

12. The magnetoresistance effect film according to claim 10, wherein said antiferromagnetic layer is made of NiMn or an alloy containing NiMn at least no less than 80 at %, and wherein said antiferromagnetization promote layer is made of at least one selected from Ir, Pd, Pt, Rh, Ru, Re and Os.

13. A magnetoresistance effect head comprising a magnetoresistance effect film, conductive films and electrode portions, wherein said conductive films are conductively connected to said magnetoresistance effect film through said electrode portions, wherein said magnetoresistance effect film is a spin valve magnetoresistance effect film which comprises a multilayered film including a non-magnetic metal layer, a ferromagnetic layer formed on one surface of the nonmagnetic metal layer, a soft magnetic layer formed on the other surface of said non-magnetic metal layer, and an antiferromagnetic layer which is formed on a surface of said ferromagnetic layer remote from the other surface of said ferromagnetic layer abutting said non-magnetic metal layer so as to pin a direction of magnetization of said ferromagnetic layer, wherein said antiferromagnetic layer is made of a compound containing Mn and having a CuAu-I regular crystal structure, and wherein said antiferromagnetic layer is subjected to a crystallization treatment by laser irradiation so as to exhibit antiferromagnetism.

14. The magnetoresistance effect head according to claim 13, wherein said crystallization treatment of the antiferromagnetic layer is carried out by applying the laser irradiation to a film surface of the antiferromagnetic layer upon completion of formation of the antiferromagnetic layer.

15. The magnetoresistance effect head according to claim 14, wherein said antiferromagnetic layer is formed on a substrate and the laser irradiation is applied to the film surface of the antiferromagnetic layer to crystallize the antiferromagnetic layer so as to manifest an antiferromagnetic characteristic, and wherein said ferromagnetic layer, said non-magnetic metal layer and said soft magnetic layer are formed in the order named on said antiferromagnetic layer applied with the laser irradiation.

16. The magnetoresistance effect head according to claim 14, wherein said soft magnetic layer, said non-magnetic metal layer, said ferromagnetic layer and said antiferromagnetic layer are formed on a substrate in the order named, and wherein the laser irradiation is applied to the film surface of said antiferromagnetic layer to crystallize the antiferromagnetic layer so as to manifest an antiferromagnetic characteristic.

17. The magnetoresistance effect head according to claim 13, wherein said crystallization treatment of the antiferromagnetic layer is carried out while applying the laser irradiation to the antiferromagnetic layer during deposition of the antiferromagnetic layer.

18. The magnetoresistance effect head according to claim 17, wherein the laser irradiation is applied to said antiferromagnetic layer during deposition of the antiferromagnetic layer on a substrate to crystallize the antiferromagnetic layer so as to manifest an antiferromagnetic characteristic, and wherein said ferromagnetic layer, said non-magnetic metal layer and said soft magnetic layer are formed in the order named on said antiferromagnetic layer applied with the laser irradiation.

19. The magnetoresistance effect head according to claim 17, wherein after forming said soft magnetic layer, said non-magnetic metal layer and said ferromagnetic layer on a substrate, the laser irradiation is applied to said antiferromagnetic layer during deposition of the antiferromagnetic layer to crystallize the antiferromagnetic layer so as to manifest an antiferromagnetic characteristic.

20. The magnetoresistance effect head according to claim 13, wherein said crystallization treatment by the laser irradiation is carried out in a vacuum film forming apparatus.

21. The magnetoresistance effect head according to claim 13, wherein said antiferromagnetic layer is made of PtMn or an alloy containing PtMn at least no less than 80 at %, or made of NiMn or an alloy containing NiMn at least no less than 80 at %.

22. The magnetoresistance effect head according to claim 13, wherein an antiferromagnetization promote layer is formed on a substrate directly or on a surface of an under layer, the other surface of the under layer abutting the substrate, and said antiferromagnetic layer, said ferromagnetic layer, said non-magnetic metal layer and said soft magnetic layer are formed on said antiferromagnetization promote layer in the order named, and wherein said antiferromagnetization promote layer is made of at least one selected from Ir, Pd, Pt, Rh, Ru, Re, Os, Al, Cu, Au and Ag.

23. The magnetoresistance effect head according to claim 22, wherein said antiferromagnetic layer is made of PtMn or an alloy containing PtMn at least no less than 80 at %, and wherein said antiferromagnetization promote layer is made of at least one selected from Ir, Pd, Pt, Rh, Ru, Re, Os, Al, Cu, Au and Ag.

24. The magnetoresistance effect head according to claim 22, wherein said antiferromagnetic layer is made of NiMn or an alloy containing NiMn at least no less than 80 at %, and wherein said antiferromagnetization promote layer is made of at least one selected from Ir, Pd, Pt, Rh, Ru, Re and Os.

* * * * *